US012724686B2

(12) United States Patent
Bogtob et al.

(10) Patent No.: US 12,724,686 B2
(45) Date of Patent: Sep. 1, 2026

(54) DUPLICATION AVOIDANCE FOR MUTABLE EVENT BASED METRICS

(71) Applicant: Datadog, Inc., New York, NY (US)

(72) Inventors: Karim Bogtob, Cournon D'auvergne (FR); Emmanuel Manousack Tran, Paris (FR); Amina Bouabdallah, Compiègne (FR); Louis Jolibois, Lyons (FR)

(73) Assignee: Datadog, Inc., New York, NY (US)

( * ) Notice: Subject to any disclaimer, the term of this patent is extended or adjusted under 35 U.S.C. 154(b) by 395 days.

(21) Appl. No.: 18/389,383

(22) Filed: Nov. 14, 2023

(65) Prior Publication Data

US 2025/0156292 A1 May 15, 2025

(51) Int. Cl.
*G06F 11/30* (2006.01)
*G06F 11/00* (2006.01)

(52) U.S. Cl.
CPC ...... *G06F 11/3075* (2013.01); *G06F 11/3082* (2013.01)

(58) Field of Classification Search
CPC ............. G06F 11/3075; G06F 11/3082; G06F 2201/86
See application file for complete search history.

(56) References Cited

U.S. PATENT DOCUMENTS 11,675,816 B1 * 6/2023 Chandrasekharan ........................ G06F 11/3082 707/737
2013/0027284 A1 * 1/2013 Sakamaki ............ G09G 3/3611 345/87
2016/0092312 A1 * 3/2016 Dornquast .......... G06F 11/1435 707/692
2023/0027284 A1 * 1/2023 Ippatapu ................. G06F 3/067
2023/0221864 A1 * 7/2023 Jain ......................... G06F 3/064 711/154

OTHER PUBLICATIONS

Singh, Gurminder, "Deduplication at Scale", Medium—Amplitude Engineering, May 23, 2019. https://amplitude.engineering/dedupe-events-at-scale-f9e416e46ca9 (Year: 2019).*

* cited by examiner

*Primary Examiner* — Jonathan P Ouellette
(74) *Attorney, Agent, or Firm* — Lerner David LLP

(57) ABSTRACT

The technology disclosed herein provides a mechanism to avoid double counting when generating metrics from monitoring events received from an endpoint (e.g., end user's web browser, or mobile application). A unique identifier is assigned to each monitoring event matching a metric definition. When the number of unique identifiers assigned is below a predetermined threshold, a deduplication system determines whether the unique identifier for a given monitoring event is duplicative of any other unique identifiers, corresponding to other monitoring events, using a hash set. When the number of unique identifiers exceeds the predetermined threshold, the unique identifiers are automatically added to a probabilistic data structure, such as a scalable Bloom filter. In this scenario, the deduplication system would determine whether the unique identifier for the given monitoring event is duplicative of any other identifiers in the probabilistic data structure.

24 Claims, 9 Drawing Sheets

DUPLICATION AVOIDANCE FOR MUTABLE EVENT BASED METRICS

BACKGROUND

Generally, a monitoring system can include a service configured to receive data that describes an operation or event happening on a client device or customer server. The monitoring system can be configured to perform one or more actions in response to receiving the data in a time-sensitive manner. Examples of these actions include viewing the events as they happen, graphing trends and various values over time, searching for events that match some criteria, and correlating events that happen on multiple distributed machines relating to a single operation.

Events can be counted or measured based on defined metrics. The metrics may be defined based on criteria. By way of example, metrics can be defined to count events during a session, such as a browser session, when the session event includes 5 or more clicks on a product. In some scenarios, however, the counting or measurement can be inaccurate as a result of events meeting the same metric definition multiple times. For example, if a metric is defined as 5 or more interactions with objects, the event may be counted a first time when 5 interactions occur and counted a second time when 6 interactions (i.e., more than 5) occur, resulting in an inaccurate count.

BRIEF SUMMARY

The present disclosure describes a system for generating metrics that avoids counting different versions of a same mutable event. The solution utilizes multiple stateful workloads, and ensures that events are processed only once, even if different versions of the same event occur.

One aspect of the disclosure provides a system comprising memory one or more processors in communication with the memory. The one or more processors may be configured to receive a defined set of one or more metric definitions for monitoring events associated with user interaction, detect events that satisfy the one or more metric definitions, assign a unique identifier to each event that satisfies the one or more metric definitions, determine, for a first number of events, whether the assigned unique identifier is duplicative of any other identifiers in a hash set, determine when a second number of events is received, wherein the second number exceeds a threshold, and determine, for the second number of events, whether the assigned unique identifier is duplicative of any other identifiers in a probabilistic data structure. The probabilistic data structure may be, for example, a scalable bloom filter based on one or more hash functions. The probabilistic data structure may be initialized to a size to accommodate a third number of unique identifiers, and resized when a fourth number of unique identifiers is received.

According to some examples, detecting the events that satisfy the one or more metric definitions comprises filtering the events to retain mutable events and omit non-mutable events, and grouping the filtered mutable events into a specific stream, wherein the specific stream is read by a first reducer having access to the defined set of one or more metric definitions and processed to produce an aggregation request in an aggregation stream. The aggregation stream may be partitioned by metric definition and timestamp. The aggregation request may be received by a second reducer, wherein for each partition the second reducer determines whether the aggregation request was already received, and aggregates the aggregation request into a bucket if it was not already received. The system may be further configured to determine, for the first number of events, whether the assigned unique identifier is duplicative of any other identifiers in the hash set comprises maintaining the hash set of unique identifiers in the bucket. Determining when the second number of events is reached may include determining when the hash set of unique identifiers includes the second number of identifiers. The one or more processors may be configured to add the unique identifiers from the hash set into the probabilistic data structure when the hash set includes the second number of unique identifiers.

According to some examples, the user interaction may include communication between a user device and at least one of a web site, web application, web service, web Application Programing Interface (API), mobile application, or program.

According to some examples, a first event associated with a first set of data, and a second event associated with the first set of data, will produce the same unique identifier if the first event and the second event satisfy the same metric definition. A single event meeting multiple different metric definitions is deduplicated using a first memory for the first metric definition and a second memory for the second metric definition. Hence, the same event is deduplicated for each specific metric definition.

Another aspect of the disclosure provides a computer-implemented method, comprising receiving, at one or more processors, a defined set of one or more metric definitions for monitoring events associated with user interaction, detecting, with the one or more processors, events that satisfy the one or more metric definitions, assigning, with the one or more processors, a unique identifier to each event that satisfies the one or more metric definitions, determining, with the one or more processors for a first number of events, whether the assigned unique identifier is duplicative of any other identifiers in a hash set, determining, with the one or more processors, when a second number of events is received, wherein the second number exceeds a threshold, and determining, with the one or more processors for the second number of events, whether the assigned unique identifier is duplicative of any other identifiers in a probabilistic data structure.

The probabilistic data structure may be, for example, a scalable bloom filter based on one or more hash functions. The probabilistic data structure may be initialized to a size to accommodate a third number of unique identifiers, and resized when a fourth number of unique identifiers is received.

According to some examples, detecting the events that satisfy the one or more metric definitions comprises filtering the events to retain mutable events and omit non-mutable events, and grouping the filtered mutable events into a specific stream, wherein the specific stream is read by a first reducer having access to the defined set of one or more metric definitions and processed to produce an aggregation request in an aggregation stream. The aggregation stream may be partitioned by metric definition and timestamp. The aggregation request may be received by a second reducer, wherein for each partition the second reducer determines whether the aggregation request was already received, and aggregates the aggregation request into a bucket if it was not already received. The system may be further configured to determine, for the first number of events, whether the assigned unique identifier is duplicative of any other identifiers in the hash set comprises maintaining the hash set of unique identifiers in the bucket. Determining when the second number of events is reached may include determining when the hash set of unique identifiers includes the second number of identifiers. The one or more processors may be configured to add the unique identifiers from the hash set into the probabilistic data structure when the hash set includes the second number of unique identifiers.

According to some examples, the user interaction may include communication between a user device and at least one of a web site, web application, web service, web Application Programing Interface (API), mobile application, or program.

According to some examples, a first event associated with a first set of data, and a second event associated with the first set of data, will produce the same unique identifier if the first event and the second event satisfy the same metric definition. A single event meeting multiple different metric definitions is deduplicated using a first memory for the first metric definition and a second memory for the second metric definition.

Yet another aspect of the disclosure provides a non-transitory computer-readable medium storing instructions executable by one or more processors for performing a method, comprising receiving a defined set of one or more metric definitions for monitoring events associated with user interaction, detecting events that satisfy the one or more metric definitions, assigning a unique identifier to each event that satisfies the one or more metric definitions, determining, for a first number of events, whether the assigned unique identifier is duplicative of any other identifiers in a hash set, determining when a second number of events is received, wherein the second number exceeds a threshold, and determining, for the second number of events, whether the assigned unique identifier is duplicative of any other identifiers in a probabilistic data structure.

DETAILED DESCRIPTION

Figure 1:
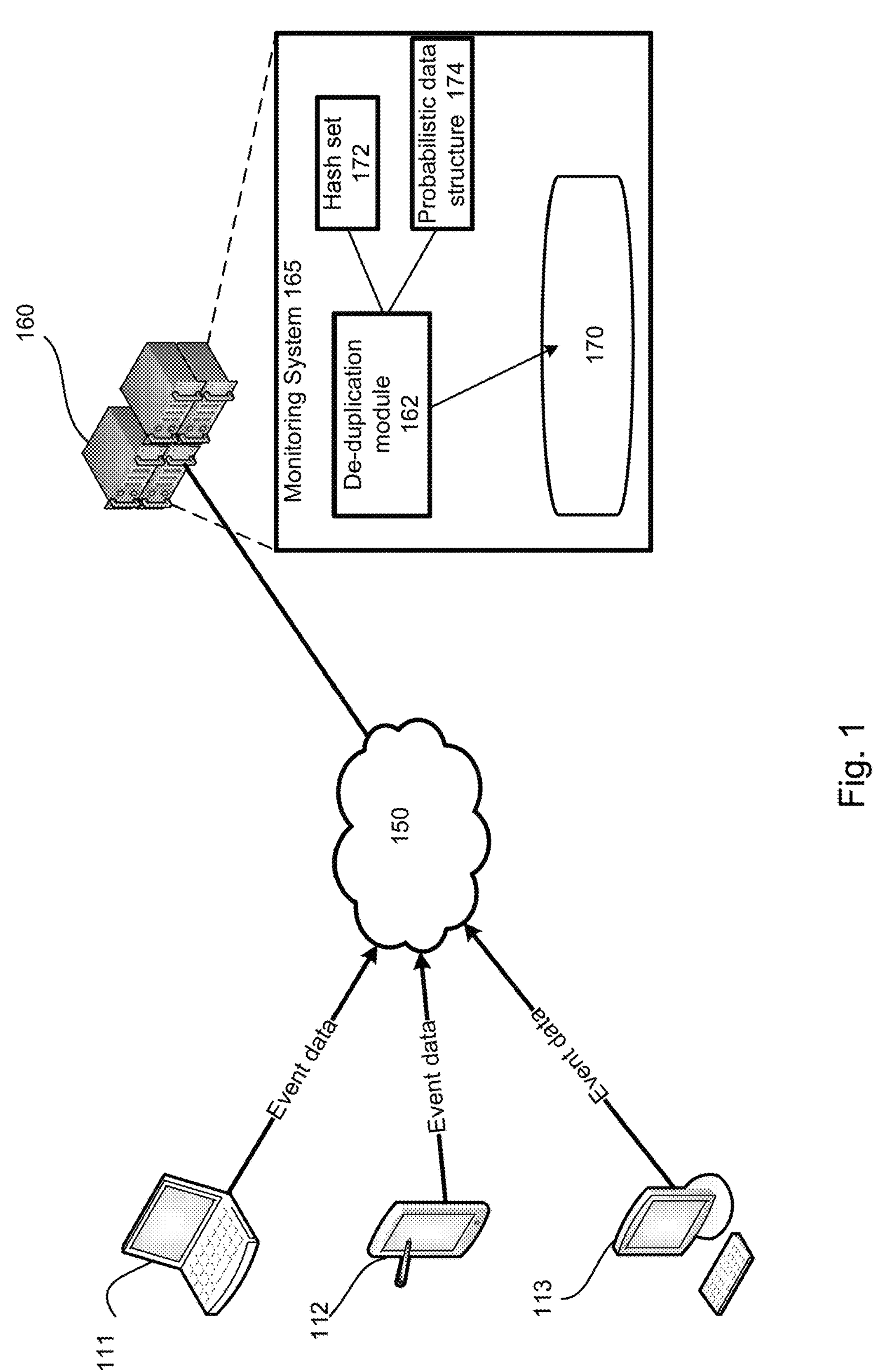
FIG. 1 is a pictorial diagram illustrating an example computing environment including an example system for reliably generating metrics according to aspects of the disclosure.

The present disclosure provides a mechanism to avoid double counting when generating metrics from monitoring events received from an endpoint (e.g., end user's web browser, or mobile application). A unique identifier is assigned to each monitoring event matching a metric definition. The unique identifier (e.g., signature) may be based on, for example, a session identifier which identifies a browser session of the end user, a view identifier, a name for the metric definition, etc. When the number of unique identifiers assigned is below a predetermined threshold, a deduplication system determines whether the unique identifier for a given monitoring event is duplicative of any other unique identifiers, corresponding to other monitoring events, using a hash set. When the number of unique identifiers exceeds the predetermined threshold, the unique identifiers are automatically added to a probabilistic data structure, such as a scalable Bloom filter. In this scenario, the deduplication system would determine whether the unique identifier for the given monitoring event is duplicative of any other identifiers in the probabilistic data structure.

Detecting the events, assigning the unique identifiers, and determining whether the assigned identifiers are duplicative of previously assigned identifiers may be performed by a system of workloads. The workloads may include, for example, a rule mapping workload, a first reducer (e.g., Metrics Reducer), and a second reducer.

The rule mapping workload consumes a stream of monitoring events in a stream of structured events and filters, the events using a custom monitoring metrics rule, such that mutable events are kept for further processing and non-mutable events may be omitted from further processing. The mutable events are grouped, for example by session identifier, into a specific stream. Grouping by session identifier ensures that events from the same session are in the same specific stream and ultimately used against the same stream partition's state.

The first reducer has access to the metric definition. It receives the specific stream and processes the specific stream using the metric definition to produce aggregation requests. The first reducer keeps a reference in its state that it has taken into account a specific event for a specific metric definition and drops the event update if it is already taken into account. The stream of produced aggregation requests may then be partitioned by, for example, metric name and timestamp.

Multiple different first reducers may provide streams of aggregation requests to the second reducer. Each aggregation request may have an associated identifier. The second reducer may receive the aggregation requests and aggregate them into a local data structure for each partition. If the second reducer has already received the aggregation request, based on its associated identifier, it will drop the payload. If the second reducer has not already received the aggregation request, it will aggregate the request into a data structure such as a bucket, referred to herein as a temporal bucket. The bucket may include a hash set, such that when a number of unique identifiers is below a threshold, the hash set is used for the deduplication. When the number of unique identifiers exceeds the threshold, the identifiers in the hash set may be moved to a probabilistic data structure, such as a scalable Bloom filter, for the deduplication.

The system described is advantageous because it allows for accurate detection of custom-defined metrics at cloud scale.

FIG. 1 is a diagram of an example computing environment 100 for reliably generating metrics. The computing environment 100 includes a plurality of client computing devices 111, 112, 113 in communication with one or more servers 160 through a network 150. The client computing devices 111-113 can communicate with websites, applications, or the like via the network 150. In doing so, the client computing devices 111-113 generate event data, which is received at the server 160. By way of example, an event may include a transaction, an error, or other occurrences. An event may be a sequence of spans, each span representing a unit of processing work performed by the client computing device.

The server 160 may be configured to perform one or more services, such as monitoring services, in connection with receiving the event data from the client devices 111-113. In this regard, the server 160 may be configured to execute a monitoring system 165. Such services performed by the server 160 can include determining whether the event data meets any custom-defined metrics definitions, deduplicating events that meet the custom-defined metrics definitions, storing information regarding the deduplicated event data that meets the custom-defined metrics definitions, generating reports regarding the event data, etc.

The one or more processors 160 may be configured to structure the event data received from the client devices 111-113 by executing one or more modules, such as a deduplication module 162. The structured event data may be stored in an analytics database 170. The structure of the event data can help improve performance of the monitoring services, for example, by reducing query response times, reduce processing overhead for performing the monitoring services, etc.

In storing event data, the servers 160 may keep a sliding window of events that passed and remember for which metrics an event was already counted. The deduplication module 162 may assign a unique identifier to each event matching a metric definition. For each given event, the deduplication module 162 determines whether the given event is duplicative of other events that were already counted. When the number of unique identifiers that have been assigned is below a predetermined threshold, the deduplication module 162 may utilize a hash set 172 for deduplication. For example, when the number of assigned unique identifiers is below the threshold, the deduplication module 162 determines whether the unique identifier for a given event is duplicative of any other unique identifiers in the hash set 172. When the number of unique identifiers assigned meets or exceeds the threshold, the deduplication module 162 may utilize a probabilistic data structure 174 for the deduplication. For example, when the number of unique identifiers exceeds the predetermined threshold, the unique identifiers may be automatically added to the probabilistic data structure 174, for comparison to the given event and determining whether the given event is duplicative.

The metrics may be defined by a customer or other entity requesting monitoring of the events. Customers can choose a strategy for counting events as meeting a metrics definition. For example, the customer can select to count the event when the event first matches a definition, or the customer can select to count the event when the event ends while matching the definition. Moreover, customers can define their custom metrics with a metric name (e.g. "monitoring.sessions.converted"), a query allowing to select the events, groups with which the customers want to partition their custom metric (e.g. by country and by device type), and a field they want to measure on the events if they do not want a simple count.

The client computing devices 111-113 may be any of a variety of computing devices operated at various locations. While three client computing devices are illustrated in the example, it should be understood that numerous client computing devices may provide event data to the servers 160.

In some examples, generating and transmitting event data by the client devices 111-113 may include executing application instances by the client devices 111-113. For example, an application instance can monitor processing behavior of a respective client device, and can send the event data as a respective data stream. The event data can include data values representing processing actions, behaviors, operations, or the like executed by the client devices 111-113.

The servers 160 may store the event data in analytics database 170. The stored data may be queried, for example by a customer, for information regarding the event data meeting custom metrics definitions. The structure of the event data stored in the analytics database 170 may be configured to minimize storage size of the event data in the analytics database. The structure of the event data in the analytics database 170 allows redundant data to be discarded, resulting in a reduction of the event data from its original size. The servers 160 may ingest the event data continuously or semi-continuously.

Figure 2:
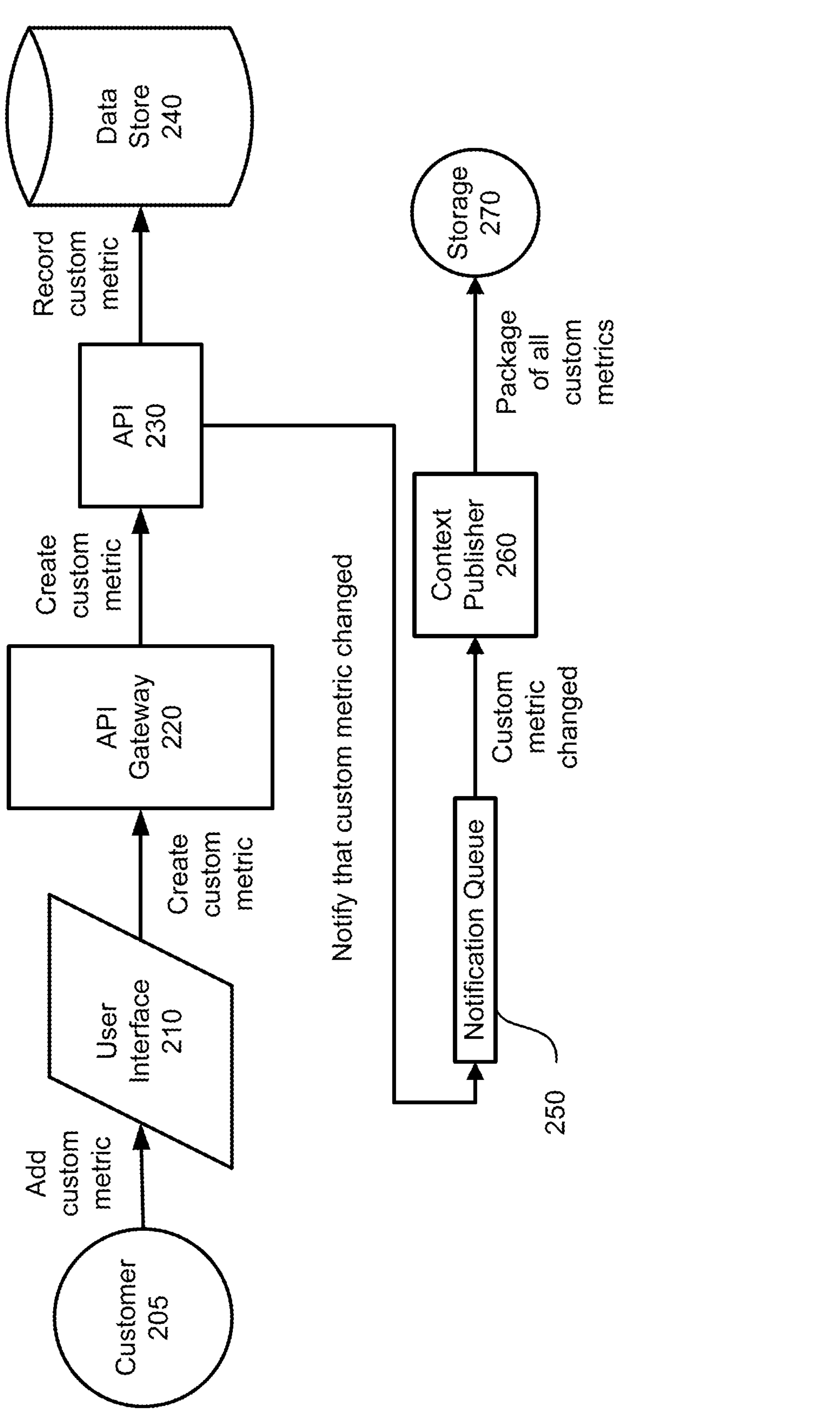
FIG. 2 is a process flow diagram illustrating an example of defining custom metric definitions according to aspects of the disclosure.

FIG. 2 illustrates an example process flow for defining custom metrics. A customer 205 may add a custom metric through a user interface 210. The custom metric input by the customer 205 may be transmitted to an application programming interface (API) 230 for storing into a database 240 via an API gateway 220. The API 230, through a notification system, triggers building of a package of metrics definitions. All custom metrics from a customer 205 or a plurality of customers may be bundled in the package and pushed to storage 270, to be available for downstream workloads.

The customer 205 may be an entity requesting monitoring of events. For example, the customer 205 can be an organization, business, end user, or other entity seeking metrics to provide an indication of how end users are interacting with the customer's website or application.

The user interface 210 may be a graphical user interface, command line interface, or any other type of interface. In some examples, the user interface 210 provides one or more input fields for the customer 205 to enter information defining the metric. Such information may relate to a name for the metric, a type of metric, an operation to be measured by the metric, a value for the operation, or any of a variety of other types of information. According to some examples, the input received at the user interface 210 may be converted to a format for a REpresentational State Transfer (REST) API.

The database 240 may be, for example, any type of data store adapted for high-volume storage, such as file storage (e.g., file system), block storage, blob storage, or any sort of persistent storage. The database may be scalable and flexible to adapt to querying and indexing demands.

The notification system may include, for example, notification queue 250 and context publisher 260. For example, the notification queue 250 may temporarily store an indication that a customer's metrics definition changed. The context publisher 260 may receive the notification that the customer's metric definition changed. Moreover, the context publisher 260 may build a package with all metrics definitions for a given customer to make such metrics definitions available for other workloads.

The storage 270 may be, for example, cloud storage, a database, etc. The storage 270 may be unstructured, such as blob storage. In other examples, the storage 270 may be disk storage, file systems, data lakes, or any other architecture.

Figure 3:
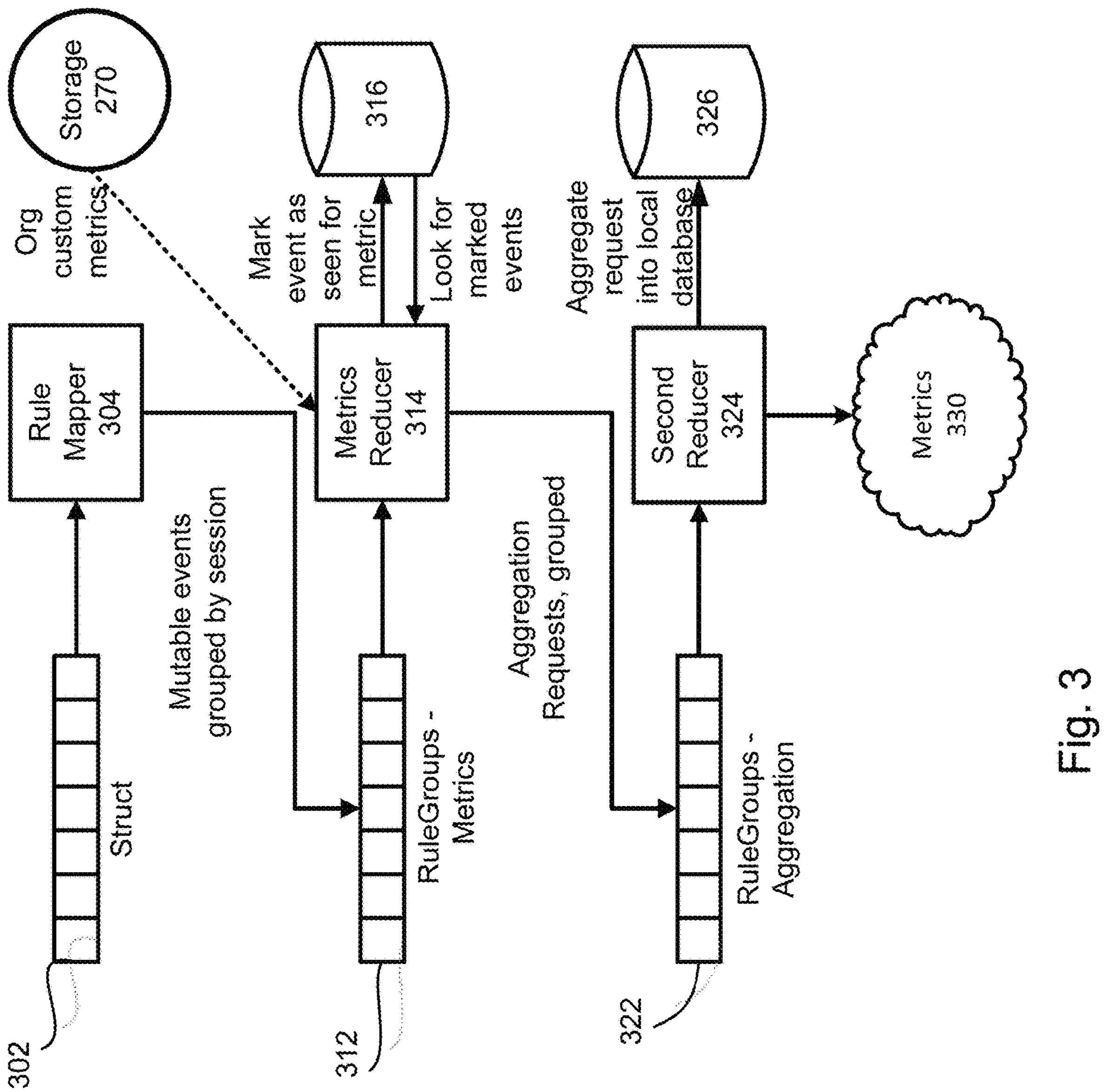
FIG. 3 is a functional block diagram illustrating an example architecture of a deduplication module according to aspects of the disclosure.

FIG. 3 illustrates an example architecture of a deduplication module. Monitoring events may be kept in a data structure or record, such as struct 302. The monitoring system uses structured events from the struct 302 to percolate the metrics definitions and output actual values to a metrics platform 330. For example, Rule Mapper workload 304 may read the struct 302 and map the struct events into a group, referenced as RuleGroups cluster 312. The RuleGroups cluster 312 may be separated into different topics, wherein each topic is a mapped stream of events. Each stream may be partitioned to groups based on properties of its messages. For example, messages having the same properties may be grouped together.

In some examples, the Rule Mapper workload 304 may consume the stream of monitoring events passing on the struct 302. Using a custom rule, the Rule Mapper workload 304 may filter the events such that only mutable events are processed. The Rule Mapper workload 304 may group the mutable events by an identifier, such as a session identifier. The mutable events may be grouped into a specific stream, referred to as a topic. In this regard, all mutable events having the same identifier will end up in the same partition. When the identifier is a session identifier, all mutable events from the same session will end up in the same partition.

The specific stream, or topic, is read by a first workload, such as a Metrics Reducer workload 314. As it processes incoming streams, the Metrics Reducer workload 314 may mark each event as viewed. Such markers may be stored in database 316. In this regard, the monitoring Metrics Reducer workload 314 can access the database 316 to look for marked events to determine whether an event has already been processed.

The Monitoring Metrics Reducer workload 314 has access to storage 270, wherein the packages of custom metrics are stored. Accordingly, the monitoring Metrics Reducer 314 has access to all relevant custom metrics for the customer. When processing events, the monitoring Metrics Reducer 314 compares the events to the custom metrics definitions to produce aggregation requests in an aggregation request stream 322. Aggregation requests are described in further detail below in connection with FIG. 4. The monitoring Metrics Reducer 314 is described in further detail in connection with FIG. 5. A second reducer 324 consumes the aggregation request stream 322 and associates a state for each of its partitions. The second reducer 324 aggregates the request streams 322 into a local database 326, and produces resulting metrics 330. The second reducer 324 is described in further detail below in connection with FIG. 6.

Returning to FIG. 3, the aggregation request stream 322 may be partitioned by metric name and timestamp. In this regard, all aggregation requests of the same metric and timestamp are grouped into the same partition.

The aggregation request stream 322 is input to a second reducer 324. The second reducer 324 reads the aggregation requests and aggregates them into a local database 326. The aggregation into the local database 326 may be based on metric name, roll-up timestamp, and tags. The second reducer 324 may further notify a metric platform 330 of the value of a given metric and tags at a given timestamp if aggregation requests are received for the given metric.

Figure 4:
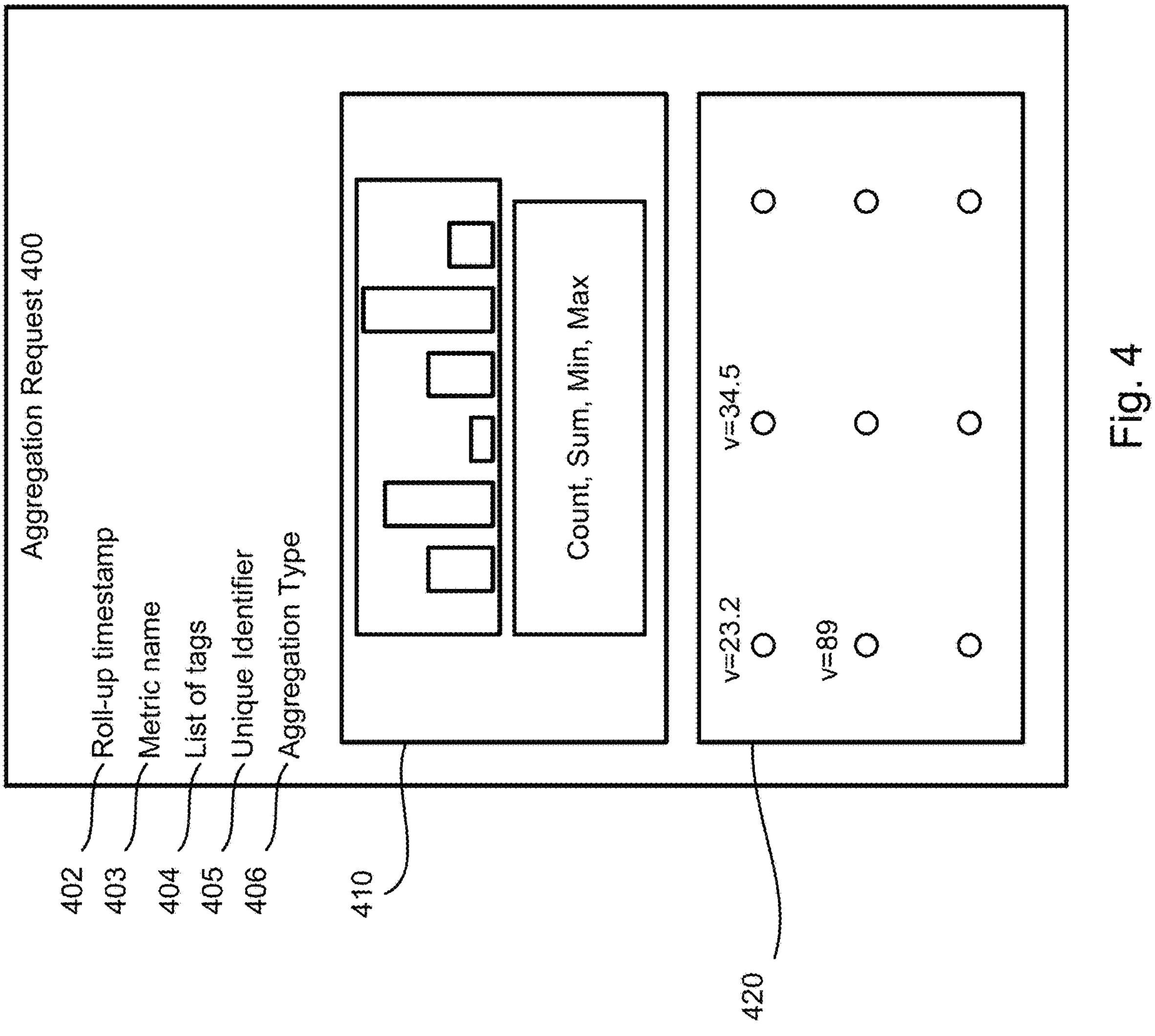
FIG. 4 illustrates an example of an aggregation request according to aspects of the disclosure.

FIG. 4 illustrates an example of an aggregation request 400. The aggregation request 400 is a structure defining how metrics should be aggregated. The aggregation request 400 may also include a summary, such as a sketch 410 or list of values 420, for a specific metric. The specific metric may be identified by, for example, metric name 403. The summary may also be specific to other parameters, such as a time period, tags, etc. For example, the aggregation request 400 may specify a roll-up timestamp 402 (e.g., a specific timestamp or range of timestamps), a list of tags 404, summary identifier 405, aggregation type 406, etc. The list of tags 404 may be annotations added to metrics values. The annotations allow sub-partitioning of the resulting time series. The summary identifier 405 may be a unique identifier for the aggregation request 400. The aggregation type 406 may specify how aggregation should be performed, such as by aggregating a summary (e.g., sketch) for a specific {metric name, roll-up timestamp, tags} or by a point value. While the example of FIG. 4 illustrates both a sketch 410 and a list of values 420, the aggregation request 400 may include either type of summary or a different type of summary.

Figure 5:
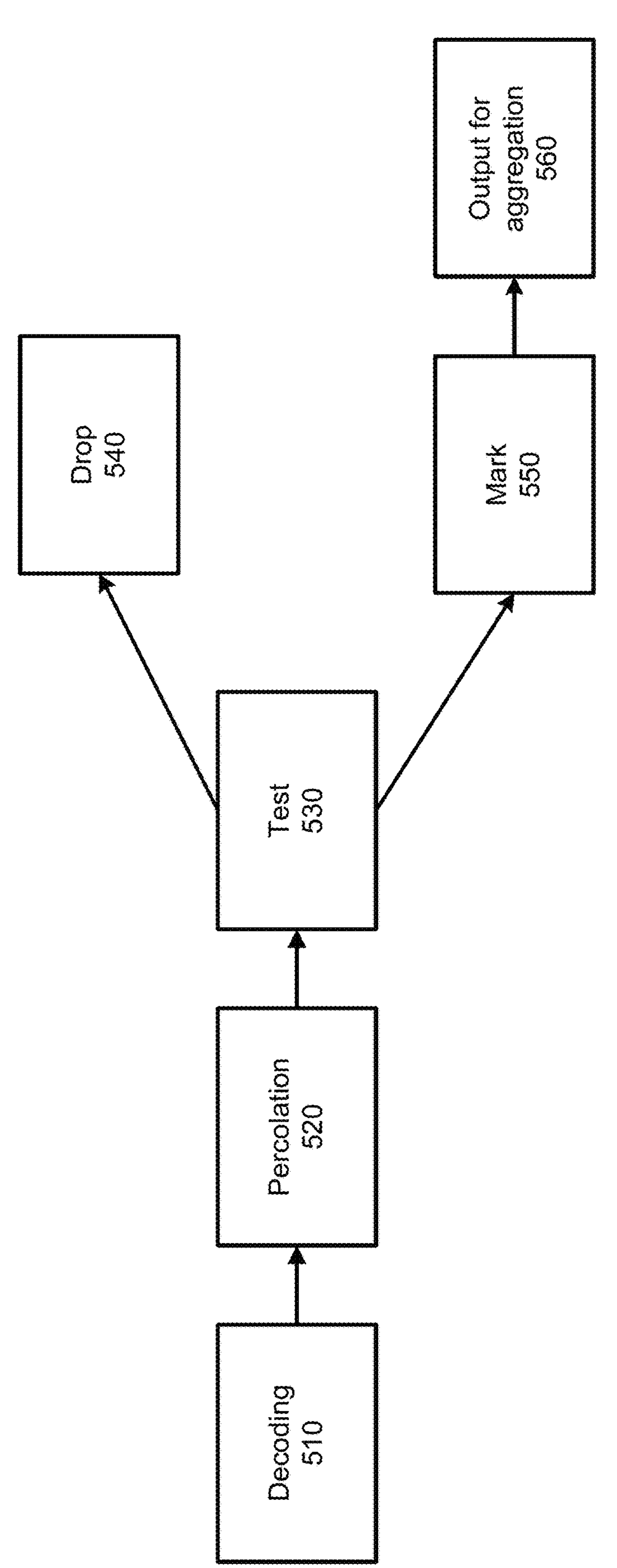
FIG. 5 is a flow diagram illustrating a detailed example of processing by a node of FIG. 3.

FIG. 5 illustrates an example of processing by the Metrics Reducer 324 of FIG. 3, which consumes the RuleGroups stream 312 of mutable events grouped by session and associates a state for each of its partitions. For each event of each partition, the Metrics Reducer performs decoding 510, percolation 520, and testing 530 for deduplication. Events already used for the metric are dropped (540). Events that were not already used for the metric are marked (550) as seen and output for aggregation (560).

Decoding 510 may include transforming an event from a low level format to an exploitable format.

Relevant custom metrics definitions for the event may be loaded. For example, referring to FIG. 3, the custom metrics definitions may be accessed by the Metrics Reducer 314 from storage 270. Percolating 520 may include comparing the events to the relevant custom metrics definitions and determining which events meet the custom metrics definitions. In some examples, the custom metrics definitions may be applied as a filter, wherein the events are passed through the filter and events meeting the custom metrics definitions pass through and will be used for counting, measuring, building point values, etc. In some examples, a point is generated for each such event, the point being associated with the custom metric definition. Events that do not meet any custom metrics definitions are omitted from further processing.

Testing 530 may include determining whether the event has already been seen by the Metrics Reducer 314. For example, referring to FIG. 3, the Metrics Reducer 314 may load the database 316 storing the marked events, and determine whether the event has already been marked in the database 316. The event being marked in the database 316 may indicate that the event has already been counted for the metric definition.

The database 316 may be a data structure, such as a bit vector or other data structure. According to some examples, the database 316 may include a number of bit vectors. The value of each bit vector may represent all possible custom metric definitions that the event could match in its lifetime. An example of such a bit vector may be:

```
{
  "view-id-1": [1,0,1,0],
  "session-id-2": [1,1,0,0]
}
```

The metrics definitions can be sorted, such as by their identifiers, to determine their relative positions in the bit vector. The bit vector may be initialized the first time the Metrics Reducer 314 discovers an event identifier. The size of the bit vector may be determined by the number of eligible custom metric definitions for the event having that event identifier.

If the event was already marked, the event may be dropped in block 540 such that the event is not counted again for the custom metrics definition. In the example where a point is generated during percolation 520, the point may be dropped or deleted in block 540 when the event was already counted.

If the event was not already marked in the database 316, in block 550 the event may be marked. In block 560 the event may be output for aggregation. For example, the point generated for the metric is output in an aggregation request. As described above, such aggregation requests may be grouped by metric name, timestamp, and/or other parameters.

According to some examples, the Metrics Reducer 314 writes aggregation requests with an at-least-once guarantee. In this regard, events processed by the Metrics Reducer 314 are guaranteed to be processed at least once, but may be processed several times. For example, re-processing of an event that has already been processed may occur as a result of deployments, partition reassignments, scale up, scale down, crashes, or the like. The at-least-once guarantee may be implemented through a stateful streaming framework built on top of an event processing system. The guarantee may result in producing the same message multiple times. The Metrics Reducer 314 and the second reducer 324 may have producer/consumer relationship, wherein the second reducer 324 may reduce the same aggregation requests multiple times. To avoid skewing metrics and introducing errors, the second reducer 324 may also have a deduplication process, working at a higher scale to deduplicate its read payloads. The Metrics Reducer 314 may build each aggregation request with an aggregation request identifier that is unique to a version of the event (e.g., original processing, first re-processing, second re-processing, etc.) it used to build the aggregation request.

Figure 6:
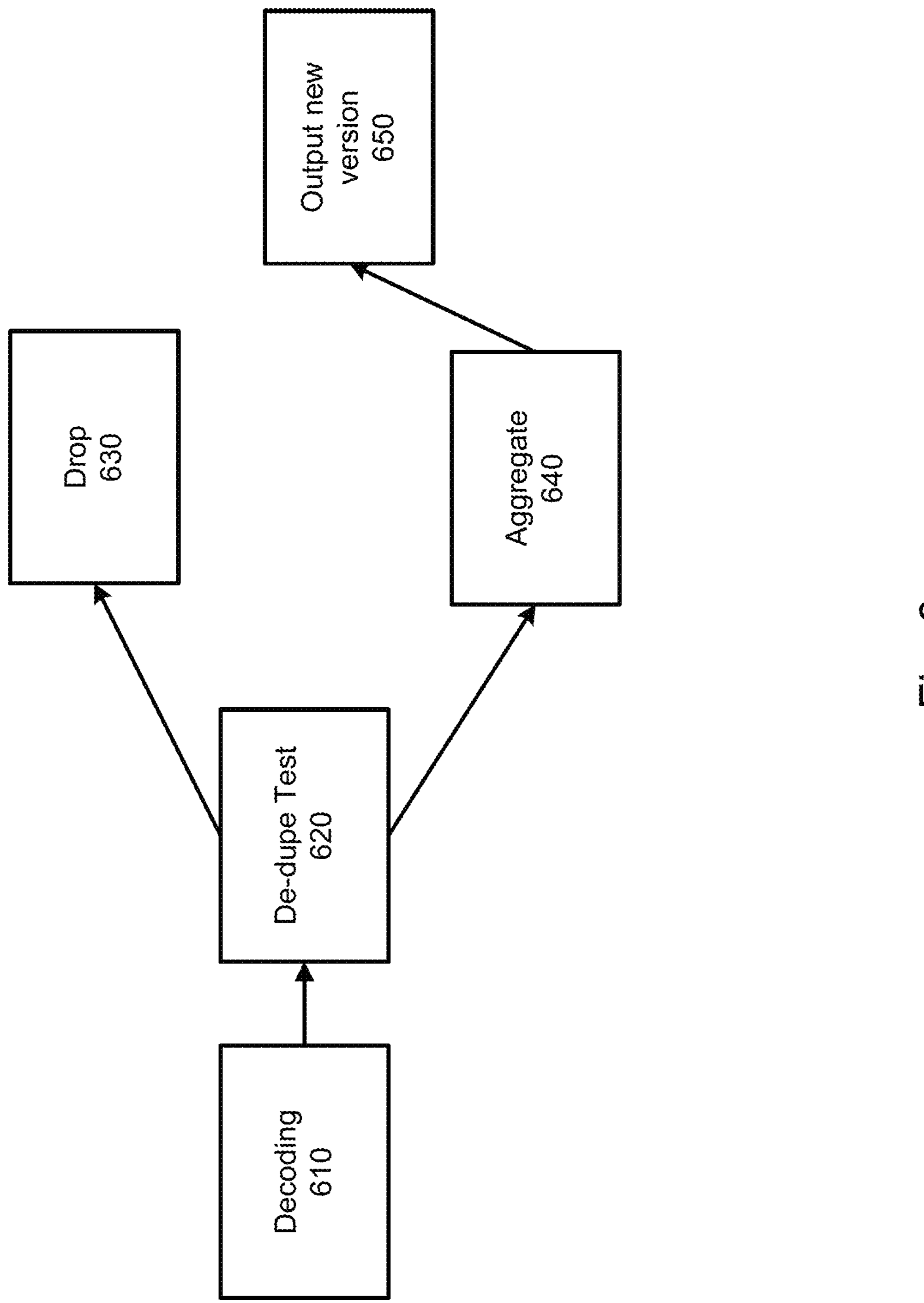
FIG. 6 is a flow diagram illustrating a detailed example of processing by another node of FIG. 3.

FIG. 6 illustrates an example of processing performed by the second reducer 324 of FIG. 3. The second reducer 324 consumes a stream of aggregation requests and associates a state to each of its partitions. The state may be, for example, a key-value store or database. The state can be accessed by a key, such as a tuple of parameters associated to each aggregation requests. For example, the key can be {metric name, timestamp, tags} which represents values that should be aggregated together. A value associated with the key is a temporal bucket. The value may be, for example, a summary or other information based on numerical aggregations and a data structure (e.g., hash set or probabilistic data structure) used for deduplication.

For each inbound aggregation request of each partition, the second reducer 324 performs decoding 610 and a deduplication test 620. Where the deduplication test 620 detects a duplicate, the aggregation request is dropped (630). Where the deduplication test 620 does not detect a duplicate, the aggregation request is aggregated (640) and output as a new version (650).

Decoding the aggregation request may include transforming the request from a low level format to an exploitable format. A relevant state for the aggregation request may be obtained using the key. The relevant state may be used for deduplication 620. For example, when an aggregation request is received, a state relevant to the aggregation request is accessed by the key {timestamp, metric name, set of tags}. A value corresponding to the key includes a temporal bucket, which includes a summary of numerical aggregations and a deduplication system, such as a hashset or a probabilistic data structure (e.g., Bloom filter). Performing the deduplication includes testing the aggregation request's unique identifier against the hashset or probabilistic data structure.

If the aggregation request is determined to be a duplicate, the aggregation request may be dropped in block 630. However, if the aggregation request was not already processed by the second reducer 324, it is aggregated (640) into the temporal bucket. Further, the metrics platform is notified of the new value of the metric at the given timestamp and with the set of tags. The new metric value is the resulting summary of all aggregations requests having the same metric name, timestamp and set of tags merged altogether.

Figure 7:
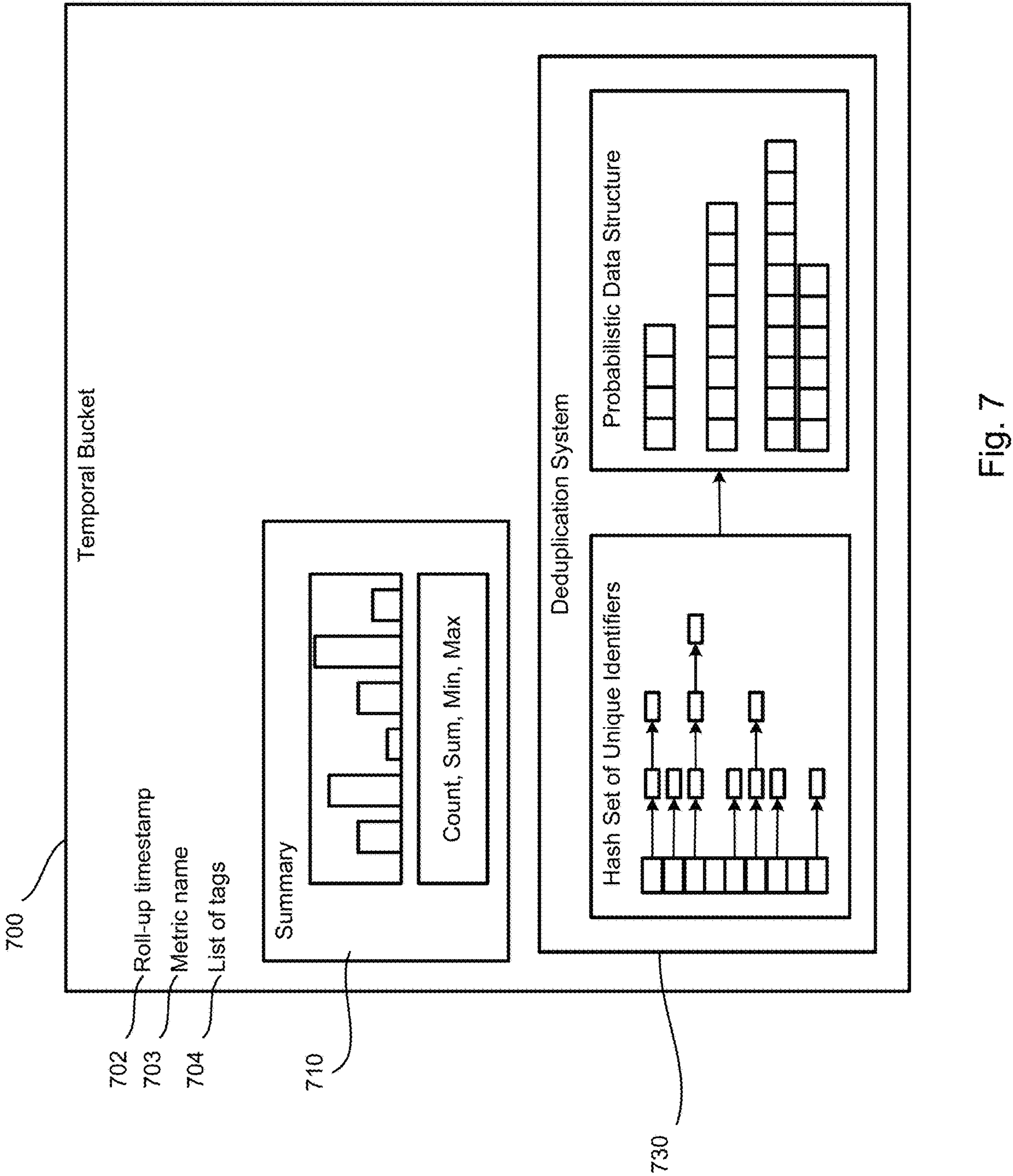
FIG. 7 illustrates an example of a temporal bucket according to aspects of the disclosure.

FIG. 7 illustrates an example of a temporal bucket 700. The temporal bucket may include a roll-up timestamp 702, metric name 703, list of tags 704, and summary 710 such as a sketch. The temporal bucket may further include a deduplication system 730, such as a hash set of unique identifiers which can be upgraded to a probabilistic data structure, such as a Bloom filter. For each value coming from an aggregation request to be processed, the value may be processed into the sketch or other type of summary. This allows for reduced latency in aggregation while maintaining precision.

While FIG. 3 illustrates one Metrics Reducer 314 providing aggregation requests to the second reducer 324, the second reducer 324 may receive aggregation requests from multiple reducers. The deduplication performed by the second reducer 324 may utilize unique identifier fields present on the aggregation requests. The unique identifiers may be, for example, 32, 64, 128, 256, or any other number of bits of unsigned integers. The unique identifiers may be stored in a first type of data structure when fewer than a threshold number of unique identifiers exist, and a second type of data structure different from the first type when the threshold number is met or exceeded. For example, below the threshold number, a hash set of the unique identifiers may be kept in hashset of the temporal bucket. At or above the threshold number, all items of the hash set are added to a probabilistic data structure, such as a scalable bloom filter that replaces the hashset inside the temporal bucket. The probabilistic data structure may include a number of hash functions, configured to stay at <0.01% probability of false positives.

An initial size of the probabilistic data structure may be optimized to keep a predetermined number of unique identifiers, such as several thousand, hundreds of thousands, millions, or more. The probabilistic data structure may be resized once the number of unique identifiers approaches or reaches the predetermined number.

Using the techniques described above, a first event associated with a first set of data, and a second event associated with the first set of data, will produce the same unique identifier if the first event and the second event satisfy the same metric definition. A single event meeting multiple different metric definitions is deduplicated using a first memory for the first metric definition and a memory state for the second metric definition.

Figure 8:
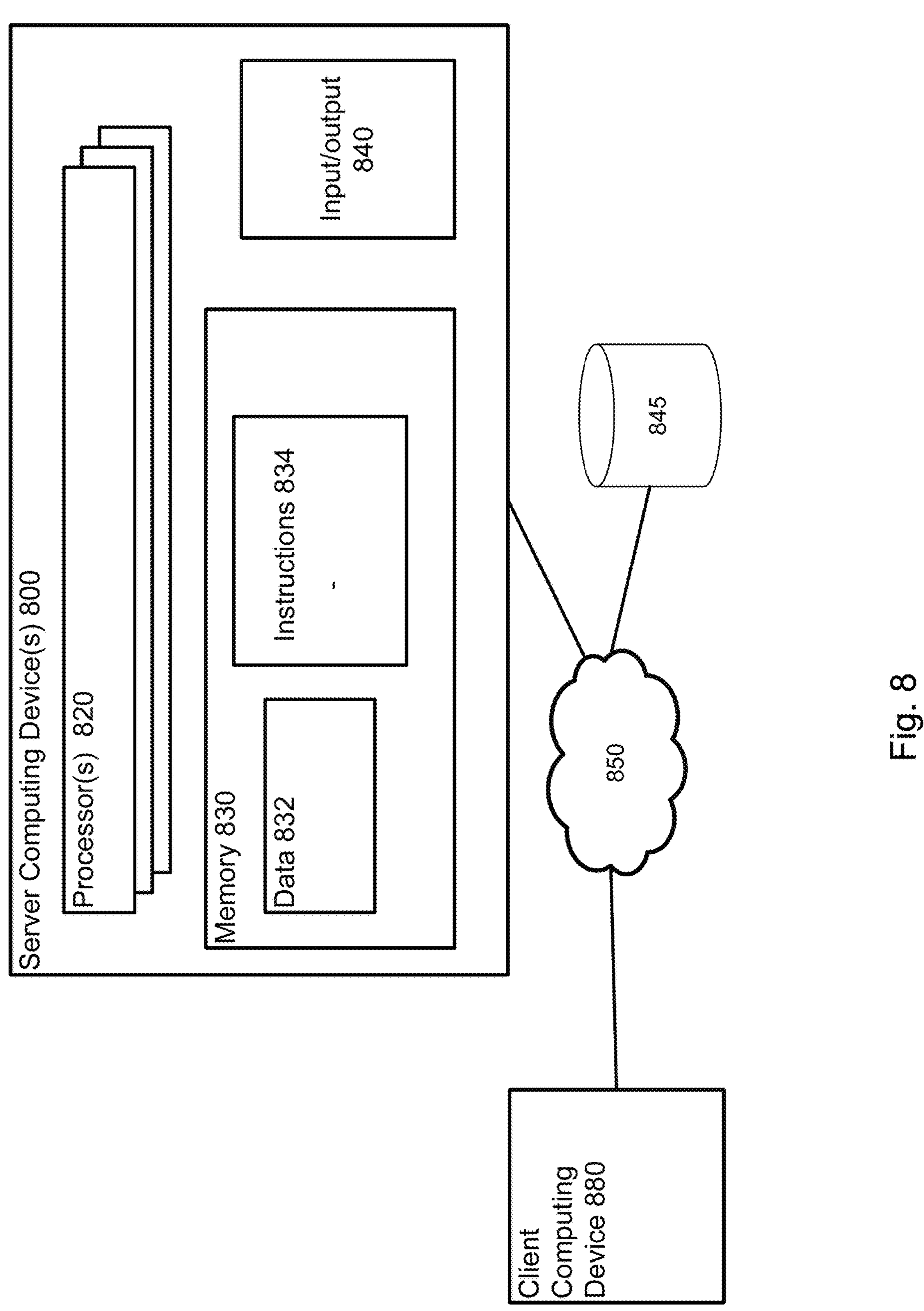
FIG. 8 is a block diagram illustrating an example system according to aspects of the disclosure.

FIG. 8 illustrates an example computing device 800 in communication with a client device 880 through a network 850. The computing device 800 includes one or more processors 820, memory 830 and other components typically present in computing devices. Memory 830 can store information accessible by the one or more processors 820, including instructions 834 that can be executed by the one or more processors 820.

Memory 830 can also include data 832 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 834 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 832 may be retrieved, stored or modified by the one or more processors 820 in accordance with the instructions 834. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 820 can be any conventional processors, such as a commercially available CPU. Alternatively, the processors can be dedicated components such as an application specific integrated circuit ("ASIC") or other hardware-based processor. Although not necessary, one or more of computing devices 800 may include specialized hardware components to perform specific computing processes.

The computing device 800 may include a communication interface 840 enabling communication between the device 800 and other components, such as a distributed database 845, key-value store, consumer systems, etc. The computing device may communicate over a network 850 and with other devices using various protocols and systems, such that the network can be part of the Internet, World Wide Web, specific intranets, wide area networks, or local networks. The network 850 can utilize standard communications protocols, such as Ethernet, WiFi, HTTP, protocols described in IEEE 802.11, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

Although FIG. 8 functionally illustrates the processor, memory, and other elements as being within the same block, the processor, computer, computing device, or memory can actually comprise multiple processors, computers, computing devices, or memories that may or may not be stored within the same physical housing. Accordingly, references to a processor, computer, computing device, or memory will be understood to include references to a collection of processors, computers, computing devices, or memories that may or may not operate in parallel. Yet further, although some functions described below are indicated as taking place on a single computing device having a single processor, various aspects of the subject matter described herein can be implemented by a plurality of computing devices, for example, in the "cloud." Similarly, memory components at different locations may store different portions of instructions 834 and collectively form a medium for storing the instructions. Various operations described herein as being performed by a computing device may be performed by a virtual machine. By way of example, instructions 834 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Figure 9:
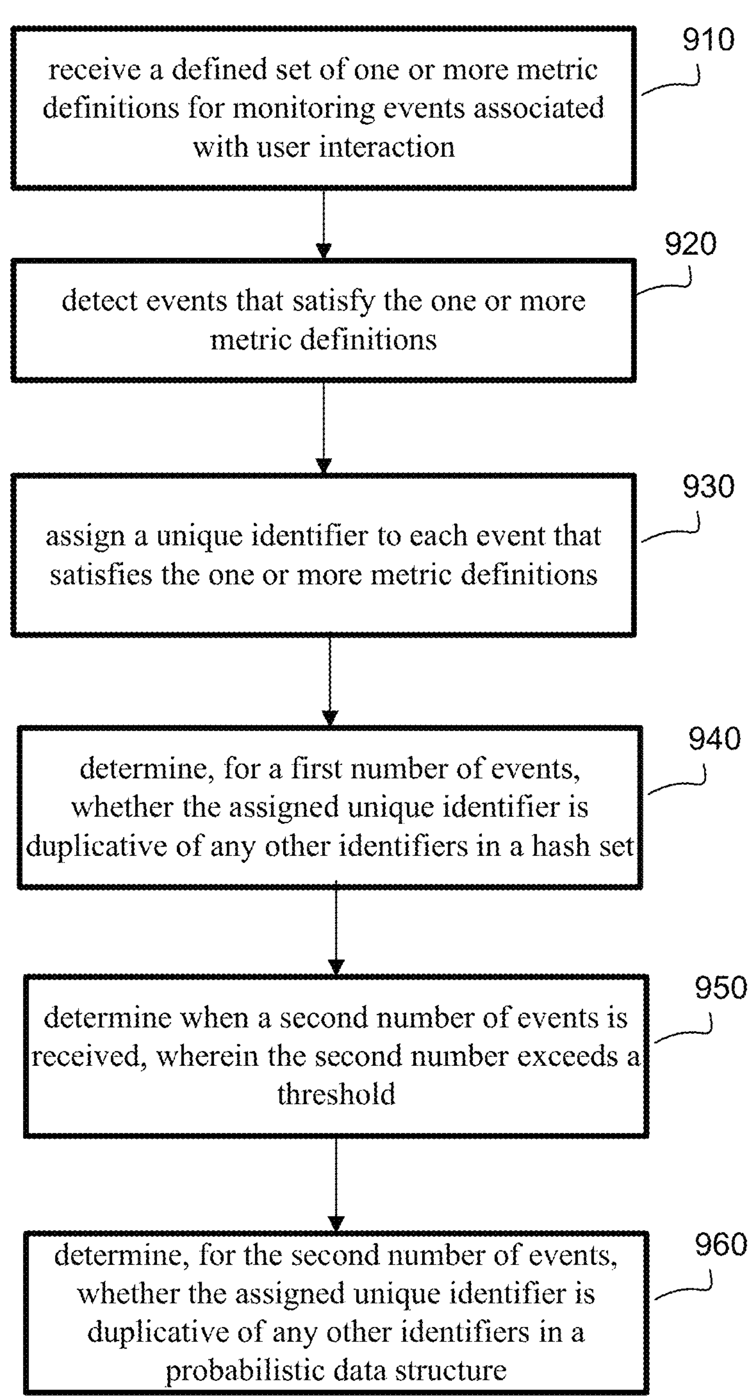
FIG. 9 is a flow diagram illustrating an example method according to aspects of the disclosure.

FIG. 9 illustrates an example method 900 of monitoring events and generating metrics based on the monitoring. While operations are described in a particular order, it should be understood that operations may be performed in a different order and/or some operations may be performed simultaneously or in parallel. Moreover, operations can be added or omitted.

In block 910, a defined set of one or more metric definitions is received, such as from a customer, for monitoring events associated with user interaction. The metrics definitions may seek information regarding behaviors or interactions of devices with the customer's website, application, or other utility. For example, the metrics definitions may seek a count of events, such as visits to web pages, products added to an online cart, an amount of time spent viewing particular objects, clicks on content items, etc.

In block 920, events that satisfy the one or more metric definitions are detected. According to some examples, this may include filtering the events to retain mutable events and omit non-mutable events, and grouping the filtered mutable events into a specific stream. The specific stream may be read by a first reducer having access to the defined set of one or more metric definitions and processed to produce an aggregation request in an aggregation stream. The aggregation stream may be partitioned by metric definition and timestamp. The aggregation request may be received by a second reducer, wherein for each partition the second reducer determines whether the aggregation request was already received, and aggregates the aggregation request into a bucket if it was not already received.

In block 930, a unique identifier is assigned to each event that satisfies the one or more metric definitions.

In block 940, it is determined, for a first number of events, whether the assigned unique identifier is duplicative of any other identifiers in a hash set. For example, when the number of assigned unique identifiers is below a predetermined threshold, the identifiers may be stored in a hash set. The hash set may be used to determine if incoming events are duplicate.

In block 950, it may be determined when the number of events received exceeds the threshold. When the number of assigned unique identifiers exceeds the threshold, the unique identifiers may be added to a probabilistic data structure, such as a scalable Bloom filter. When a second number of events is received, wherein the second number exceeds a threshold.

In block 960, after the threshold number of events is reached, it may be determined for subsequent incoming events whether the assigned unique identifier is duplicative of any other identifiers in a probabilistic data structure.

When the unique identifier is determined not to be a duplicate, whether using the hash set or the probabilistic data structure, a metric value (e.g., count, measure, etc.) may be generated for the event corresponding to the unique identifier. In this regard, the event is counted as meeting a metric definition, while ensuring that the metric is not double counted. On the contrary, if the unique identifier is determined to be a duplicate, the event corresponding to the unique identifier is not counted as meeting the metric definition.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:

memory; and one or more processors in communication with the memory and configured to:

receive a defined set of one or more metric definitions for monitoring events associated with user interaction;

detect events that satisfy the one or more metric definitions;

assign a unique identifier to each event that satisfies the one or more metric definitions;

determine, for a first number of events, whether the assigned unique identifier is duplicative of any other identifiers in a hash set;

determine when a second number of events is received, wherein the second number exceeds a threshold; and determine, for the second number of events, whether the assigned unique identifier is duplicative of any other identifiers in a probabilistic data structure.

2. The system of claim 1, wherein the probabilistic data structure comprises a scalable bloom filter based on one or more hash functions.

3. The system of claim 1, wherein the probabilistic data structure is initialized to a size to accommodate a third number of unique identifiers, and resized when a fourth number of unique identifiers is received.

4. The system of claim 1, wherein detecting the events that satisfy the one or more metric definitions comprises filtering the events to retain mutable events and omit non-mutable events, and grouping the filtered mutable events into a specific stream, wherein the specific stream is read by a first reducer having access to the defined set of one or more metric definitions and processed to produce an aggregation request in an aggregation stream.

5. The system of claim 4, wherein the aggregation stream is partitioned by metric definition and timestamp.

6. The system of claim 5, wherein the aggregation request is received by a second reducer, wherein for each partition the second reducer determines whether the aggregation request was already received, and aggregates the aggregation request into a bucket if it was not already received.

7. The system of claim 6, wherein determining, for the first number of events, whether the assigned unique identifier is duplicative of any other identifiers in the hash set comprises maintaining the hash set of unique identifiers in the bucket.

8. The system of claim 7, wherein determining when the second number of events is reached comprises determining when the hash set of unique identifiers includes the second number of identifiers.

9. The system of claim 8, wherein the one or more processors are configured to add the unique identifiers from the hash set into the probabilistic data structure when the hash set includes the second number of unique identifiers.

10. The system of claim 1, wherein the user interaction comprises communication between a user device and at least one of a web site, web application, web service, web Application Programing Interface (API), mobile application, or program.

11. The system of claim 1, wherein a first event associated with a first set of data, and a second event associated with the first set of data, will produce the same unique identifier if the first event and the second event satisfy the same metric definition.

12. The system of claim 1, wherein a single event meeting multiple different metric definitions is deduplicated using a first memory for the first metric definition and a second memory for the second metric definition.

13. The system of claim 1, wherein the one or more processors are configured to generate a metric value when the assigned unique identifier is not duplicative of any other identifiers in the probabilistic data structure.

14. A computer-implemented method, comprising:

receiving, at one or more processors, a defined set of one or more metric definitions for monitoring events associated with user interaction;

detecting, with the one or more processors, events that satisfy the one or more metric definitions;

assigning, with the one or more processors, a unique identifier to each event that satisfies the one or more metric definitions;

determining, with the one or more processors for a first number of events, whether the assigned unique identifier is duplicative of any other identifiers in a hash set;

determining, with the one or more processors, when a second number of events is received, wherein the second number exceeds a threshold; and determining, with the one or more processors for the second number of events, whether the assigned unique identifier is duplicative of any other identifiers in a probabilistic data structure.

15. The computer-implemented method of claim 14, wherein the probabilistic data structure comprises a scalable bloom filter based on one or more hash functions.

16. The computer-implemented method of claim 14, wherein detecting the events that satisfy the one or more metric definitions comprises filtering the events to retain mutable events and omit non-mutable events, and grouping the filtered mutable events into a specific stream, wherein the specific stream is read by a first reducer having access to the defined set of one or more metric definitions and processed to produce an aggregation request in an aggregation stream.

17. The computer-implemented method of claim 16, wherein the aggregation stream is partitioned by metric definition and timestamp, and wherein the aggregation request is received by a second reducer, wherein for each partition the second reducer determines whether the aggregation request was already received, and aggregates the aggregation request into a bucket if it was not already received.

18. The computer-implemented method of claim 17, wherein determining, for the first number of events, whether the assigned unique identifier is duplicative of any other identifiers in the hash set comprises maintaining the hash set of unique identifiers in the bucket.

19. The computer-implemented method of claim 18, wherein determining when the second number of events is reached comprises determining when the hash set of unique identifiers includes the second number of identifiers.

20. The computer-implemented method of claim 19, further comprising adding the unique identifiers from the hash set to the probabilistic data structure when the hash set includes the second number of unique identifiers.

21. The computer-implemented method of claim 14, wherein the user interaction comprises communication between a user device and at least one of a web site, web application, web service, web Application Programing Interface (API), mobile application, or program.

22. The computer-implemented method of claim 14, wherein a first event associated with a first set of data, and a second event associated with the first set of data, will produce the same unique identifier if the first event and the second event satisfy the same metric definition.

23. The computer-implemented method of claim 14, wherein a single event meeting multiple different metric definitions is deduplicated using a first memory for the first metric definition and a second memory for the second metric definition.

24. A non-transitory computer-readable medium storing instructions executable by one or more processors for performing a method, comprising:

receiving a defined set of one or more metric definitions for monitoring events associated with user interaction;

detecting events that satisfy the one or more metric definitions;

assigning a unique identifier to each event that satisfies the one or more metric definitions;

determining, for a first number of events, whether the assigned unique identifier is duplicative of any other identifiers in a hash set;

determining when a second number of events is received, wherein the second number exceeds a threshold; and determining, for the second number of events, whether the assigned unique identifier is duplicative of any other identifiers in a probabilistic data structure.

* * * * *